US 6,748,920 B2

(12) United States Patent
Ito et al.

(10) Patent No.: US 6,748,920 B2
(45) Date of Patent: Jun. 15, 2004

(54) INJECTION RATIO CONTROL SYSTEM FOR INTERNAL COMBUSTION ENGINE

(75) Inventors: Yoshio Ito, Nagoya (JP); Yoshimitsu Takashima, Anjo (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 10/443,081

(22) Filed: May 22, 2003

(65) Prior Publication Data

US 2003/0217734 A1 Nov. 27, 2003

(30) Foreign Application Priority Data

May 24, 2002 (JP) ........................................ 2002-151254

(51) Int. Cl.[7] ................................................. F02B 3/00
(52) U.S. Cl. ........................ 123/299; 701/104; 123/300
(58) Field of Search ................................. 123/299, 300, 123/294; 701/104

(56) References Cited

U.S. PATENT DOCUMENTS 4,295,449 A * 10/1981 Cemenska et al. .......... 123/300
4,423,485 A * 12/1983 Sami et al. .................. 701/104

FOREIGN PATENT DOCUMENTS

| JP | 2002-213287 | 7/2002 |
| JP | 2002-327637 | 11/2002 |

* cited by examiner

*Primary Examiner*—Bibhu Mohanty
(74) *Attorney, Agent, or Firm*—Nixon & Vanderhye P.C.

(57) ABSTRACT

An injection ratio control system for an internal combustion engine performs a multi-injection, in which multiple pilot injections and a main injection are performed. The system prohibits a first injection among the pilot injections if a main injection quantity command value for the main injection is less than an N time(s) minimum guarantee determination value. An injection quantity for the first injection is added to the injection quantity for the main injection. Thus, the system controls an injection frequency per combustion in the multi-injection to prevent the use of a minute main injection quantity command value equal to or less than the N time(s) minimum guarantee determination value. As a result, the main injection is prevented from vanishing.

5 Claims, 5 Drawing Sheets

INJECTION RATIO CONTROL SYSTEM FOR INTERNAL COMBUSTION ENGINE

CROSS REFERENCE TO RELATED APPLICATION

This application is based on and incorporates herein by reference Japanese Patent Application No. 2002-151254 filed on May 24, 2002.

BACKGROUND OF THE INVENTION

1. Field of the Invention

The present invention relates to an injection ratio control system for an internal combustion engine that drives injectors based on injection quantity command values such as an injector injection command pulse period, an injector energization period, an injector injection period, or an injector valve-opening period. The injection quantity command values are calculated from command injection quantity set in accordance with an operating state or operating conditions of the engine, and fuel injection pressure measured by a sensor and the like. Specifically, the present invention relates to a fuel injection system for an internal combustion engine capable of performing a multi-injection in which fuel is injected into cylinders of the engine in multiple times by driving electromagnetic valves of the injectors during a compression stroke or an expansion stroke of the engine.

2. Description of Related Art

Conventionally, as a fuel injection system for a diesel engine, an accumulation type fuel injection system is known. The accumulation type fuel injection system accumulates high-pressure fuel in a common rail as an accumulator and injects the high-pressure fuel to respective cylinders of the engine through electromagnetic fuel injection valves (injectors) respectively mounted in the cylinders of the engine. In the accumulation type fuel injection system, a command injection quantity is calculated in accordance with an engine rotation speed and an accelerator position. Command injection timing is calculated in accordance with the engine rotation speed and the command injection quantity. An injector injection period (an injection command pulse period) is calculated in accordance with an actual fuel pressure in the common rail, which is measured by a fuel pressure sensor and the like, and the command injection quantity. Then, an electromagnetic valve of the injector is applied with pulse-shaped injector driving current for opening a nozzle needle from the command injection timing until the injection command pulse period ends. Thus, the system controls the injection quantity and the injection timing of the fuel injected into the respective cylinders.

The accumulation type fuel injection system performs a multi-step injection (a multi-injection) in compliance with present restrictions on exhaust gas and noise. More specifically, the accumulation type fuel injection system performs the multi-injection to perform stable combustion from the start of a main injection so that noise and vibration of the engine are reduced and emission performance is improved. In the multi-injection, multiple pilot injections are performed before the main injection, which can generate engine torque. In each pilot injection, a small quantity of the fuel is injected. The electromagnetic valve of the injector of a specific cylinder is driven at least twice to open the nozzle needle of the injector at least twice during a compression stroke or an expansion stroke of the engine. Thus, the multi-injection including at least two injections is performed in the cylinder. For instance, the multi-injection includes one or more pilot injections and one main injection, or includes one pilot injection, one main injection and one after injection, or includes one main injection and one or more after injections. Thus, the system inhibits rapid increase in the injection ratio in an early stage of the combustion. As a result, the noise and vibration of the engine are inhibited.

In the conventional accumulation type fuel injection system, control of a minute quantity of the fuel is more important than ever when performing the above multi-injection. However, even if the minute injection quantity command value is calculated and outputted, the pilot injection may vanish or excessive fuel may be injected in the pilot injection due to variation in hardware. The variation in the hardware includes individual difference of the injector, variation in the injection quantities among the cylinders, or performance degradation of the injector with time. In such a case, noise reduction effect of the multi-injection may be reduced, and the actual injection quantity or injection frequency may fluctuate. As a result, fluctuation of drivability or emission may be caused.

SUMMARY OF THE INVENTION

It is therefore an object of the present invention to provide an injection ratio control system that regulates an injection frequency per combustion in a multi-injection if an injection quantity command value reaches a minimum guarantee injection quantity. Thus, the use of a minute injection quantity command value is prevented. As a result, variation in an actual injection quantity or an injection frequency is prevented. Thus, variation in the actual injection quantity or the injection frequency is prevented without reducing a noise reduction effect of the multi-injection.

According to an aspect of the present invention, a main injection quantity command value for a main injection in a multi-injection is calculated in accordance with an operating state or operating conditions of an internal combustion engine. An injection frequency per combustion in the multi-injection (a multi-injection frequency) is regulated so that the main injection quantity command value becomes equal to or greater than an N time(s) minimum guarantee determination value. Thus, vanish of a pilot injection or an excessive fuel injection in the pilot injection due to variation in hardware is prevented. As a result, the variation in the actual injection quantity or the injection frequency is prevented without reducing a noise reduction effect of the multi-injection.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENTS (First Embodiment)

Figure 1:
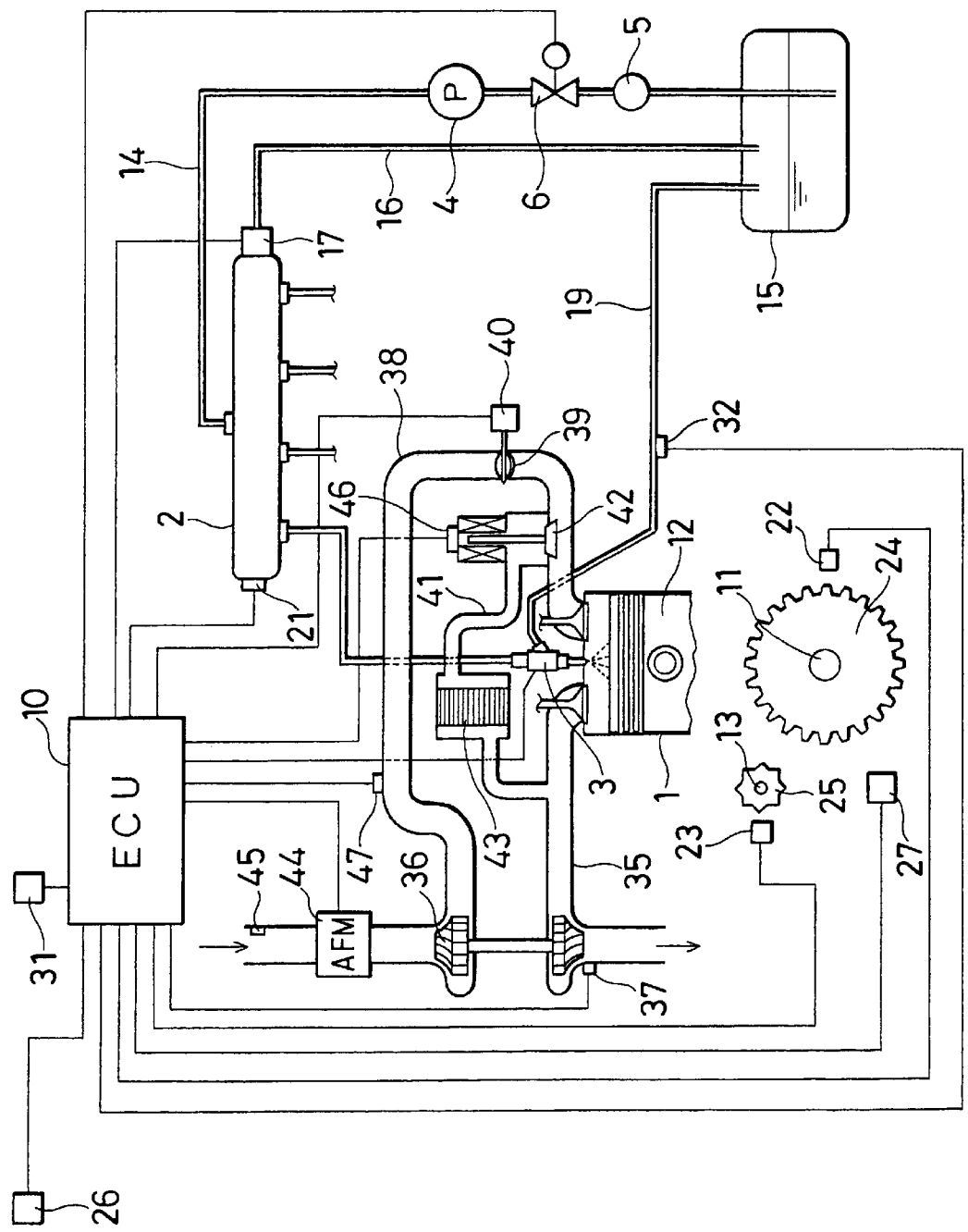
FIG. 1 is a schematic diagram showing an accumulation type fuel injection system according to a first embodiment of the present invention.

Referring to FIG. 1, an accumulation type fuel injection system according to the first embodiment is illustrated. The accumulation type fuel injection system has a common rail 2 as an accumulator, a plurality of (four, in the embodiment) injectors 3 having electromagnetic valves, a fuel supply pump 4 and an electronic control unit (ECU) 10. The common rail 2 accumulates fuel at a high pressure corresponding to a fuel injection pressure, at which the fuel is injected into respective cylinders of an internal combustion engine 1 such as a four-cylinder diesel engine mounted on a vehicle. The injectors 3 are respectively connected with the common rail 2 and inject the fuel into the respective cylinders of the engine 1. The supply pump 4 is rotated by the engine 1. The ECU 10 electronically controls the injectors 3 and the supply pump 4.

A piston 12 connected with a crankshaft 11 through a connection rod is slidably disposed in each cylinder of the engine 1.

The common rail 2 is required to continuously accumulate the high pressure corresponding to the fuel injection pressure. Therefore, the common rail 2 is supplied with the high-pressure fuel from the supply pump 4 through a high-pressure pipe 14. A return pipe 16 is disposed for returning the fuel from the common rail 2 to a fuel tank 15. A normally-close type pressure reducing valve 17 is disposed in the common rail 2 for regulating an opening degree of the return pipe 16. The pressure reducing valve 17 is an electromagnetic valve having an excellent pressure-reducing performance. The pressure reducing valve 17 is electronically controlled with pressure reducing valve driving current applied by the ECU 10 through a pressure reducing valve driving circuit. Thus, the pressure reducing valve 17 swiftly reduces the fuel pressure in the common rail 2, or the common rail pressure, from a high pressure to a low pressure. Instead of the pressure reducing valve 17, a pressure limiter may be disposed between the common rail 2 and the return pipe 16 for relieving the common rail pressure so that the common rail pressure does not exceed a limit pressure.

The injectors 3 are mounted in the four cylinders of the engine 1. Each injector 3 has a fuel injection nozzle, an electromagnetic valve (actuator), biasing means such as a spring and the like. The fuel injection nozzle injects the high-pressure fuel into each cylinder. The electromagnetic valve drives a nozzle needle of the fuel injection nozzle in valve-opening direction. The biasing means biases the nozzle needle in valve-closing direction. The fuel injection from the injector 3 to the engine 1 is electronically controlled by switching on or off of energization to the electromagnetic valve, which controls a pressure in a pressure controlling chamber of the nozzle needle. More specifically, the high-pressure fuel accumulated in the common rail 2 is injected into each cylinder of the engine 1 while the electromagnetic valve of the injector 3 of the cylinder is open. Inner leak fuel of the injectors 3 and the fuel discharged from the pressure controlling chambers (the fuel used for opening the injectors 3) is returned to the fuel tank 15 through a return pipe 19.

The supply pump 4 is a high-pressure supply pump that pressurizes drawn fuel and discharges the high-pressure fuel from a discharging outlet to the common rail 2. The supply pump 4 has a feed pump (low-pressure supply pump) 5 for drawing the fuel from the fuel tank 15. A suction control valve (actuator) 6 as an electromagnetic actuator is disposed in a fuel passage leading from the feed pump 5 to a pressurizing chamber of the supply pump 4. The suction control valve 6 regulates an opening degree (a valve-opening degree, an opening area) of the fuel passage in order to change a quantity (a pump discharging quantity, a pump pressure-feeding quantity) of the fuel discharged from the supply pump 4 to the common rail 2. The suction control valve 6 is a suction control electromagnetic valve, which is electronically controlled with a pump driving signal sent from the ECU 10 through a pump driving circuit and regulates a quantity of the fuel drawn into the pressurizing chamber of the supply pump 4 from the feed pump 5. Thus, the suction control valve 6 changes the injection pressure (the common rail pressure) at which the fuel is injected from each injector 3 into each cylinder of the engine 1.

The supply pump 4 draws the fuel from the fuel tank 15 and pressurizes the fuel. The ECU 10 commands a quantity of the fuel for the supply pump 4 to pressure-feed to the common rail 2. The common rail pressure is measured by a fuel pressure sensor 21 as fuel pressure measuring means. The ECU 10 calculates a pump driving command value (pump driving current) and an injection quantity command value (pulse-shaped injector driving current, injector injection command pulse).

The ECU 10 includes a microcomputer having functions of CPU that performs control processing and calculation processing, a storing unit (ROM, stand-by RAM, or a memory such as EEPROM or RAM) for storing various programs and data, an input circuit, an output circuit, a power supply circuit, an injector driving circuit, the pump driving circuit and the like. A voltage signal from the fuel pressure sensor 21 and other sensor signals from various sensors are inputted to the microcomputer included in the ECU 10 after the signals are converted from analog signals to digital signals by an A/D converter.

When an engine key is returned to an IG position and an ignition switch is switched on (ON) after the engine 1 is cranked, the ECU 10 electronically controls actuators of various control parts such as the electromagnetic valves of the injectors 3, the suction control valve 6 of the supply pump 4, an actuator 40 driving a throttle valve 39, and an exhaust gas recirculation valve (EGR valve) 42 regulating an exhaust gas recirculation quantity (EGR quantity), based on control programs stored in the storing unit.

The ECU 10 determines injection timing of the injectors 3 of respective cylinders and a pressure-feeding period of the supply pump 4 based on signals of a crankshaft rotation pulse and a camshaft rotation pulse. The crankshaft rotation pulse is outputted by a crank angle sensor 22 mounted on the crankshaft 11. The camshaft rotation pulse is outputted by a cam angle sensor 23 mounted on a camshaft 13. Thus, the ECU 10 maintains the actual fuel pressure in the common rail 2 (the common rail pressure) at a command injection pressure (a target injection pressure).

The crank angle sensor 22 is an electromagnetic rotation sensor for measuring a rotational angle of the crankshaft 11. The crank angle sensor 22 has a timing rotor (signal rotor) 24, which is made of magnetic material and is fixed to the crankshaft 11 of the engine 1, an electromagnetic pickup coil disposed so that the pickup coil faces the periphery of the timing rotor 24, a permanent magnet for generating magnetic flux, and the like. The timing rotor 24 is formed with a plurality of projective teeth at a predetermined angle interval (10°, for instance). If the timing rotor 24 rotates, a distance between each projective tooth and the pickup coil increases or decreases. The pickup coil outputs crank angle signals (NE pulse signals) by electromagnetic induction in accordance with the increase and decrease in the distance between the pickup coil and the projective teeth. The ECU 10 measures an engine rotation speed NE by measuring time intervals among the crank angle signals (NE pulse signals).

The cam angle sensor 23 is an electromagnetic rotation sensor for measuring a rotational angle of the camshaft 13. The cam angle sensor 23 has a timing rotor (signal rotor) 25, which is made of magnetic material and is fixed to the camshaft 13 of the engine 1, an electromagnetic pickup coil disposed so that the pickup coil faces the periphery of the timing rotor 25, a permanent magnet for generating magnetic flux, and the like. The timing rotor 25 is formed with a plurality of projective teeth at a predetermined angle interval.

The ECU 10 receives sensor signals outputted by an accelerator position sensor 26 for measuring a pressing degree of an accelerator pedal (an accelerator position ACCP), a cooling water temperature sensor 27 for measuring temperature of cooling water of the engine 1, and the like. The ECU 10 calculates a target fuel pressure PFIN in accordance with the operating state or the operating conditions of the engine 1. In order to achieve the target fuel pressure PFIN, the ECU 10 regulates the pump discharging quantity by controlling the pump driving signal applied to the suction control valve 6. More preferably, aiming to improve controlling accuracy of the fuel injection quantity, the pump driving current applied to the suction control valve 6 should be feedback-controlled so that the actual common rail pressure NPC, whish is measured by the fuel pressure sensor 21, becomes generally equal to the target fuel pressure PFIN, which is set in accordance with the engine rotation speed NE and a command injection quantity QFIN.

The ECU 10 has basic injection quantity determining means, command injection quantity determining means, injection timing determining means, command injection period determining means and injector driving means. The basic injection quantity determining means calculates an optimum basic injection quantity Q in accordance with the engine rotation speed NE and the accelerator position ACCP based on a characteristic map, which is made in advance through experimentation and the like. The command injection quantity determining means calculates the command injection quantity QFIN by tempering the basic injection quantity Q with an injection quantity correction value corresponding to engine cooling water temperature THW or fuel temperature THF. The injection timing determining means calculates command injection timing TFIN in accordance with the command injection quantity QFIN and the engine rotation speed NE based on a characteristic map, which is made in advance through experimentation and the like. The command injection period determining means calculates a command injection period (an injection command pulse period, an injector energization pulse period: TQ) in accordance with the common rail pressure NPC and the command injection quantity QFIN based on a characteristic map, which is made in advance through experimentation and the like. The injector driving means applies the pulse-shaped injector driving current (the injector injection command pulse) to the electromagnetic valve of the injector 3 of each cylinder from the command injection timing TFIN until the injection command pulse period TQ passes.

The ECU 10 receives a vehicle speed signal from a vehicle speed sensor 31 for measuring a vehicle speed SPD. The ECU 10 has a steady idling state detecting means. The steady idling state detecting means detects a steady idling state, or a light load and low rotation speed state or a no load fuel consumption state, of the engine 1. The steady idling state detecting means determines that the engine 1 is in the steady idling state when the engine rotation speed NE equal to or lower than a predetermined value (for instance, 1200 rpm), the accelerator position ACCP equal to or lower than a predetermined value (for instance, 0%), the vehicle speed SPD equal to or lower than a predetermined value (for instance, 0 km/h), the command injection quantity QFIN equal to or less than a predetermined value (for instance, 5 mm$^3$/st), or a state in which a gear of a transmission is set at a neutral (N) position is detected.

The accumulation type fuel injection system of the embodiment drives the injector 3 of a specific cylinder multiple times during one cycle of the engine 1, or during two rotations of the crankshaft 11 (through a crank angle of 720°), or in particular, during one combustion stroke of the cylinder. The one cycle of the engine 1 includes an intake stroke, a compression stroke, a combustion stroke (an explosion stroke, an expansion stroke), and an exhaustion stroke in that order. Thus, the accumulation type fuel injection system performs a multi-injection, in which the fuel is injected into each cylinder of the engine 1 in multiple times. The multi-injection includes one or more pilot injections and a main injection, for instance.

The ECU 10 has injection quantity determining means, interval determining means and injection period determining means. The injection quantity determining means calculates the respective injection quantities of the multi-injection, or a pilot injection quantity QPILOT and a main injection quantity QMAIN, from the operating state (operating information) of the engine 1 and the basic injection quantity Q. The interval determining means calculates an interval between the pilot injection and the main injection from the engine rotation speed NE and the pilot injection quantity QPILOT. The interval determining means also calculates an interval between the pilot injections from the engine rotation speed NE and the pilot injection quantity QPILOT. The injection period determining means calculates a pilot injection period (a pilot injection command pulse period: TQPILOT, a pilot injection quantity command value) from the pilot injection quantity QPILOT and the actual common rail pressure NPC. The injection period determining means also calculates a main injection period (a main injection command pulse period: TQMAIN, a main injection quantity command value) from the main injection quantity QMAIN and the common rail pressure NPC. An injection frequency per combustion in the multi-injection (a multi-injection frequency) is arbitrarily determined in accordance with the operating state or the operating conditions of the engine 1 such as the engine rotation speed NE and the command injection quantity QFIN.

The ECU 10 of the embodiment performs uneven quantity compensation control (correction of injection quantity variation among cylinders, FCCB correction) during an idling operation of the engine 1. In the FCCB correction, the ECU 10 measures a rotation speed fluctuation in each explosion stroke of each cylinder. Then, the ECU 10 compares the detection value of the rotation speed fluctuation of each cylinder with an averaged value of the rotation speed fluctuations of the entire cylinders. Then, the ECU 10 regulates the optimum injection quantity supplied to each cylinder of the engine 1 so that the rotation speed fluctuations of the cylinders are equalized.

More specifically, the ECU 10 calculates an instantaneous rotation speed at each explosion stroke of each cylinder by calculating the time interval of the NE pulse signal, which is inputted from the crank angle sensor 22. The maximum time interval of the NE pulse signal from a crank angle of 90° before a top dead center (BTDC 90° CA) to a crank angle of 90° after the top dead center (ATDC 90° CA) is inputted as a minimum rotation speed Nl of the instantaneous rotation speed of the cylinder. The minimum time interval of the NE pulse signal from the BTDC 90° CA to the ATDC 90° CA is inputted as a maximum rotation speed Nh of the instantaneous rotation speed of the cylinder. The rotation speeds Nl, Nh are not necessarily the minimum rotation speed and the maximum rotation speed. The rotation speeds Nl, Nh may be a low rotation speed and a high rotation speed, which represent the rotation speed fluctuation of the cylinder.

After the above calculations are performed for each cylinder, an each cylinder rotation speed difference ΔNk, which is a difference between the maximum rotation speed Nh and the minimum rotation speed Nl of each cylinder, is calculated. Thus, a detection value of the rotation speed fluctuation of each cylinder is calculated. Then, an averaged value ΣΔNk of the rotation speed fluctuations of the entire cylinders is calculated. More specifically, the averaged value ΣΔNk of the rotation speed fluctuations of the entire cylinders is calculated by averaging the rotation speed fluctuations of the entire cylinders. Then, the differences among the rotation speed fluctuations of the respective cylinders are calculated from the detection values of the rotation speed fluctuations of the respective cylinders and the averaged value ΣΔNk. Then, an FCCB injection quantity correction value (an FCCB correction value) or a correction value for the injection command pulse period is added to the injection quantity command value for each injection in the multi-injection, for each cylinder. The injection quantity command value is calculated for each cylinder. The FCCB correction value or the correction value for the injection command pulse period is a value required to equalize the rotation speed fluctuations of the respective cylinders. Thus, the rotation speed fluctuations of the respective cylinders are equalized.

The ECU 10 of the embodiment performs idling rotation speed control (ISC correction) for controlling the injection quantity to a certain value, which is required for maintaining a target rotation speed even if torque loaded on the engine changes. The ECU 10 performs the ISC control in order to prevent engine vibration or an engine stall, which is caused if the idling rotation speed decreases. The ECU performs the ISC control also in order to prevent engine noise or increase in the fuel consumption, which is caused if the idling rotation speed increases. Preferably, the fuel injection quantity should be feedback-controlled so that the present engine rotation speed becomes generally equal to the target rotation speed.

More specifically, the ECU 10 calculates a rotation speed difference, or a difference between the actual engine rotation speed NE and the target rotation speed, which is determined in accordance with the engine cooling water temperature THW and load conditions such as a load of an air conditioner compressor. The ECU 10 calculates an ISC injection quantity correction value (an ISC correction value) corresponding to the rotation speed difference. Then, the ECU 10 adds the ISC correction value or a correction value for the injection command pulse period to the injection quantity command value for each injection in the multi-injection, equally in the entire cylinders. The ISC correction value or the correction value for the injection command pulse period is a value required to equalize the averaged engine rotation speed to a target idling rotation speed. Thus, the averaged engine rotation speed becomes generally equal to the target idling rotation speed.

The fuel used for opening the injectors 3 is returned to the fuel tank 15 through the return pipe 19, the relief pipe. A fuel temperature sensor 32 for measuring the fuel temperature is disposed in the return pipe 19. Preferably, the fuel temperature sensor 32 should be disposed as close as possible to a point where the return pipes 19 of the respective injectors 3 gather, in order to improve measuring accuracy.

During the operation of the engine 1, the exhaust gas generated in the combustion in each cylinder passes through an exhaust pipe 35 and is used as force for driving a turbine of a variable nozzle turbo (VNT) 36. After that, the exhaust gas is discharged through a catalyst and a muffler. The VNT 36 is controlled based on signals from an intake pressure sensor 47 and a VNT driving degree sensor 37. Intake air supercharged by the VNT 36 is introduced into each cylinder through an intake pipe 38. The throttle valve 39 is disposed in the intake pie 38. An opening degree of the throttle valve 39 is regulated by the actuator, which is driven with a signal from the ECU 10.

An exhaust gas recirculation pipe 41 is connected to the intake pipe 38 for introducing exhaust recirculation gas (EGR gas), or part of the exhaust gas passing through the exhaust pipe 35, to the intake pipe 38. The exhaust gas recirculation valve (EGR valve) 42 is disposed in a connection between the exhaust gas recirculation pipe 41 and the intake pipe 38. An EGR gas cooler 43 is disposed in the exhaust gas recirculation pipe 41 for cooling the EGR gas.

The EGR valve 42 is an electromagnetic valve (electromagnetic actuator) for an exhaust gas recirculation device. The EGR valve 42 regulates a quantity (EGR quantity) of the EGR gas, which is recirculated from an exhaust system of the engine 1 to the intake pipe 38, in proportion to intensity of EGR valve driving signal. The EGR valve 42 has a valve, an electromagnetic coil (a solenoid coil) and valve biasing means such as a spring. The valve regulates an opening degree of the exhaust gas recirculation pipe 41. The electromagnetic coil drives the valve to valve-opening direction further as the EGR valve driving signal increases. The valve biasing means biases the valve in valve-closing direction.

The EGR quantity is feedback-controlled to a predetermined value based on signals from an intake airflow rate sensor (an air flow meter: AFM) 44, an intake air temperature sensor 45 and an EGR valve opening degree sensor (an EGR valve lift sensor) 46. The intake airflow rate sensor 44 measures the intake airflow rate as voltage ratio with a potentiometer. The intake air temperature sensor 45 measures the temperature of the intake air. The EGR valve opening degree sensor 46 measures a lifting degree of the EGR valve 42. The lifting degree of the EGR valve 42 is linearly controlled so that the EGR quantity becomes a value that is suitable for reducing the emission and is set for each operating state of the engine 1. Thus, the intake air, which passes through the intake pipe 38 and is drawn into each cylinder, is mixed with the exhaust gas provided from the exhaust pipe 35.

Next, an injector injection quantity controlling method of the first embodiment for preventing the main injection quantity command value from reaching a minimum guarantee injection quantity range will be explained based on FIGS. 1 to 4.

Figure 2:
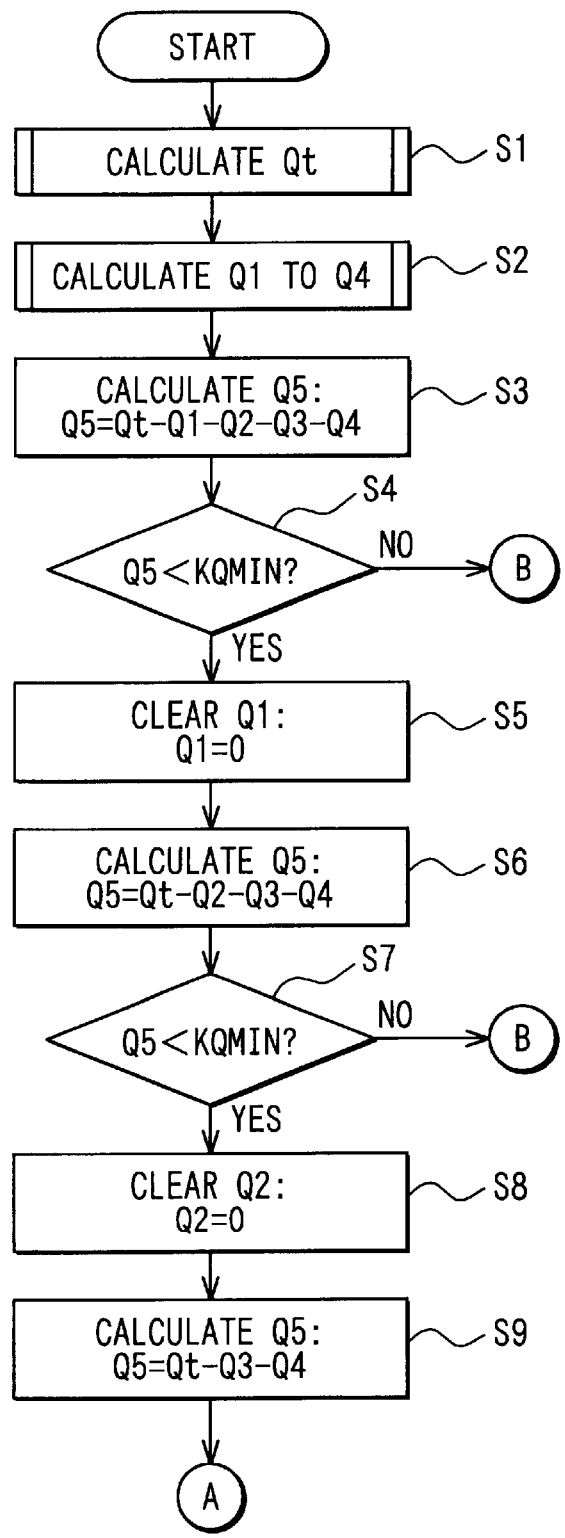
FIG. 2 is a flowchart showing a method for controlling an injection frequency per combustion in a multi-injection (a multi-injection frequency) according to the first embodiment.
Figure 3:
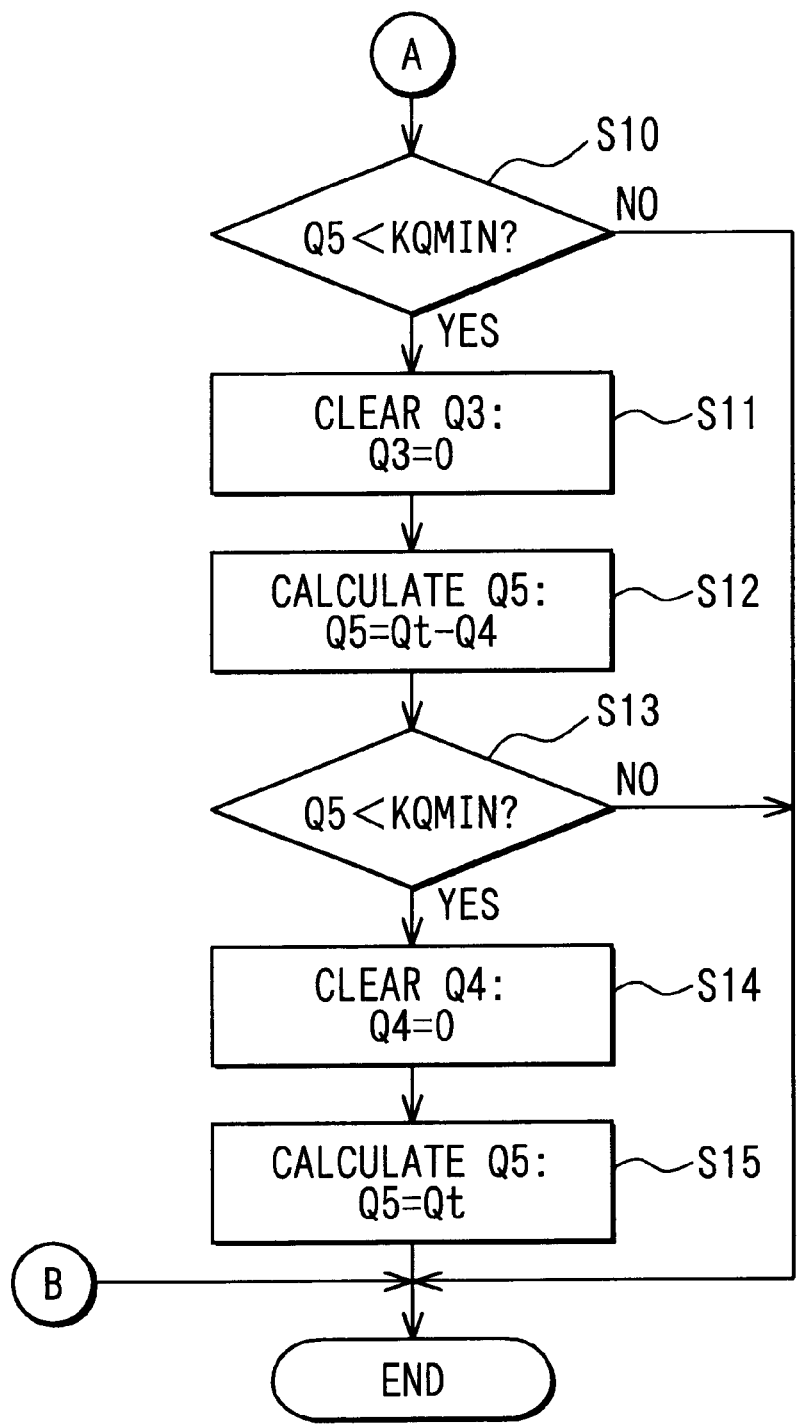
FIG. 3 is a flowchart showing the method for controlling the multi-injection frequency according to the first embodiment.

When a routine shown in FIGS. 2 and 3 is started after the FCCB correction or the ISC correction, an optimum basic injection quantity Q is calculated, for instance, in accordance with the engine rotation speed NE and the accelerator position ACCP based on a characteristic map. The characteristic map is made in advance through experimentation and the like. Then, the command injection quantity QFIN is calculated by tempering the basic injection quantity Q with injection quantity correction value corresponding to the engine cooling water temperature THW or the fuel temperature THF.

Then, in Step S1, the injection command pulse period (total injection quantity command value: Qt) is calculated in accordance with the common rail pressure NPC and the command injection quantity QFIN based on a characteristic map, which is made in advance through experimentation and the like. Then, the pilot injection quantity is calculated in accordance with the engine rotation speed NE and the basic injection quantity Q or the command injection quantity QFIN, for instance. Then, injection quantity command values Q1, Q2, Q3 and Q4 for a first injection, a second injection, a third injection and a fourth injection, or the injection quantity command values for the pilot injections in the multi-injection, are calculated in accordance with the pilot injection quantity and the common rail pressure NPC in Step S2. Then, an injection quantity command value Q5 for a fifth injection, or the injection quantity command value for the main injection in the multi-injection, is calculated by subtracting the injection quantity command values Q1 to Q4 from the total injection quantity command value Qt in Step S3.

Then, it is determined whether the injection quantity command value Q5 is less than a minimum guarantee injection quantity KQMIN or not in Step S4. If the result of the determination is "NO", the multi-injection frequency is permitted to be set up to N times (5 times, for instance), and the processing leaves the routine shown in FIGS. 2 and 3.

If the result of the Step S4 is "YES", the injection quantity command value Q1 is cleared (Q1=0), and the multi-injection frequency is set to N minus one times (four times, for instance) in Step S5. Then, the injection quantity command value Q5 is calculated by subtracting the injection quantity command values Q2 to Q4 from the total injection quantity Qt in Step S6.

Then it is determined whether the injection quantity command value Q5 is less than the minimum guarantee injection quantity KQMIN or not in Step S7. If the result of the determination is "NO", the multi-injection frequency is permitted to be set up to 4 times, and the processing leaves the routine shown in FIGS. 2 and 3.

If the result of the determination in Step S7 is "YES", the injection quantity command value Q2 is cleared (Q2=0), and the multi-injection frequency is set to N minus two times (3 times, for instance) in Step S8. Then, the injection quantity command value Q5 is calculated by subtracting the injection quantity command values Q3, Q4 from the total injection quantity command value Qt in Step S9.

Then, it is determined whether the injection quantity command value Q5 is less than the minimum guarantee injection quantity KQMIN or not in Step S10. If the result of the determination is "NO", the multi-injection frequency is permitted to be set up to three times, and the processing leaves the routine shown in FIGS. 2 and 3.

If the result of the determination in Step S10 is "YES", the injection quantity command value Q3 is cleared (Q3=0), and the multi-injection frequency is set to N−3 times (twice, for instance) in Step S11. Then, the injection quantity command value Q5 is calculated by subtracting the injection quantity command value Q4 from the total injection quantity Qt in Step S12.

Then, it is determined whether the injection quantity command value Q5 is less than the minimum guarantee injection quantity KQMIN or not in Step S13. If the result is "NO", the multi-injection frequency is permitted to be set up to twice, and the processing leaves the routine shown in FIGS. 2 and 3.

If the result of the determination in Step S13 is "YES", the injection quantity command value Q4 is cleared (Q4=0), and the multi-injection frequency is set to N−4 time(s) (once, for instance) in Step S14. More specifically, the multi-injection is not performed but a single injection, which consists of the main injection alone, is performed in Step S14. Then, the injection quantity command value Q5 is calculated from the total injection quantity command value Qt in Step S15. After that, the processing leaves the routine shown in FIGS. 2 and 3.

With the above calculation processing and control processing, the multi-injection frequency is controlled from five times to four times, to three times, to twice, and finally, to once.

Figure 4:
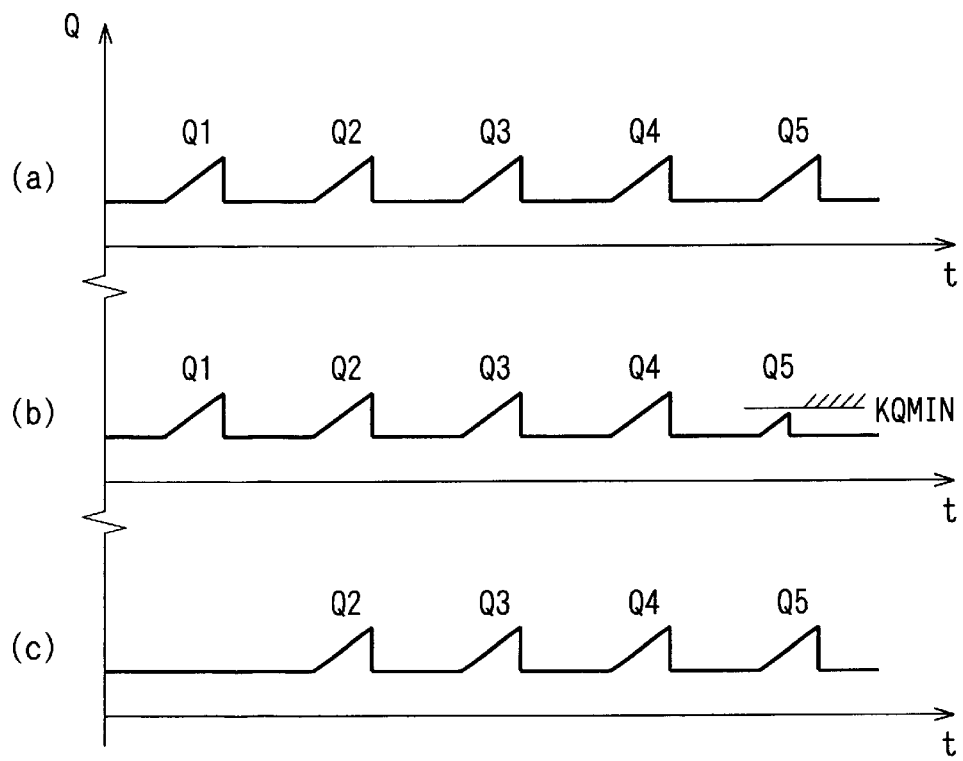
FIG. 4 is a graph showing a transition of a fuel injection ratio controlled with the multi-injection frequency controlling method according to the first embodiment.

If the injection quantity command value Q5 decreases from a state shown in the part (a) of FIG. 4 and becomes less than the minimum guarantee injection quantity KQMIN as shown in the part (b) of FIG. 4, the actual injection quantity of the fifth injection may decrease or vanish because of the variation in the hardware and the like.

Therefore, in the injection frequency controlling method according to the embodiment, the multi-injection frequency is controlled so that the injection quantity command value less than the minimum guarantee injection quantity KQMIN is not used. For instance, the injection quantity for the stopped first injection (the pilot injection in the multi-injection) is added to the injection quantity for the fifth injection, which is the main injection of the multi-injection, as shown in the part (c) of FIG. 4. In this case, the total injection quantity Qt is constant.

Likewise, the second injection is stopped if the injection quantity command value Q5 is less than the minimum guarantee injection quantity KQMIN in spite of reducing the multi-injection frequency by once by stopping the first injection. Then, the injection quantity for the stopped second injection is added to the injection quantity for the fifth injection. In the injection frequency controlling method of the embodiment, each injection has priority over the previous injection(s).

As explained above, when the injection quantity command value Q5 becomes lower than the minimum guarantee injection quantity KQMIN, the accumulation type fuel injection system controls the injection frequency per combustion so that the injection quantity command value Q5 becomes equal to or greater than the minimum guarantee injection quantity KQMIN. Thus, the use of a minute injection quantity command value is prevented. As a result, the fluctuation in the actual injection quantity or the injection frequency is prevented without reducing the effects of the multi-injection, in particular, the effects of the pilot injection, such as noise reduction. Meanwhile, the fluctuation in the drivability or the emission is prevented.

(Second Embodiment)

Next, an injector injection quantity controlling method of the second embodiment for controlling a multi-injection frequency will be explained based on FIGS. 5 and 6.

Figure 5:
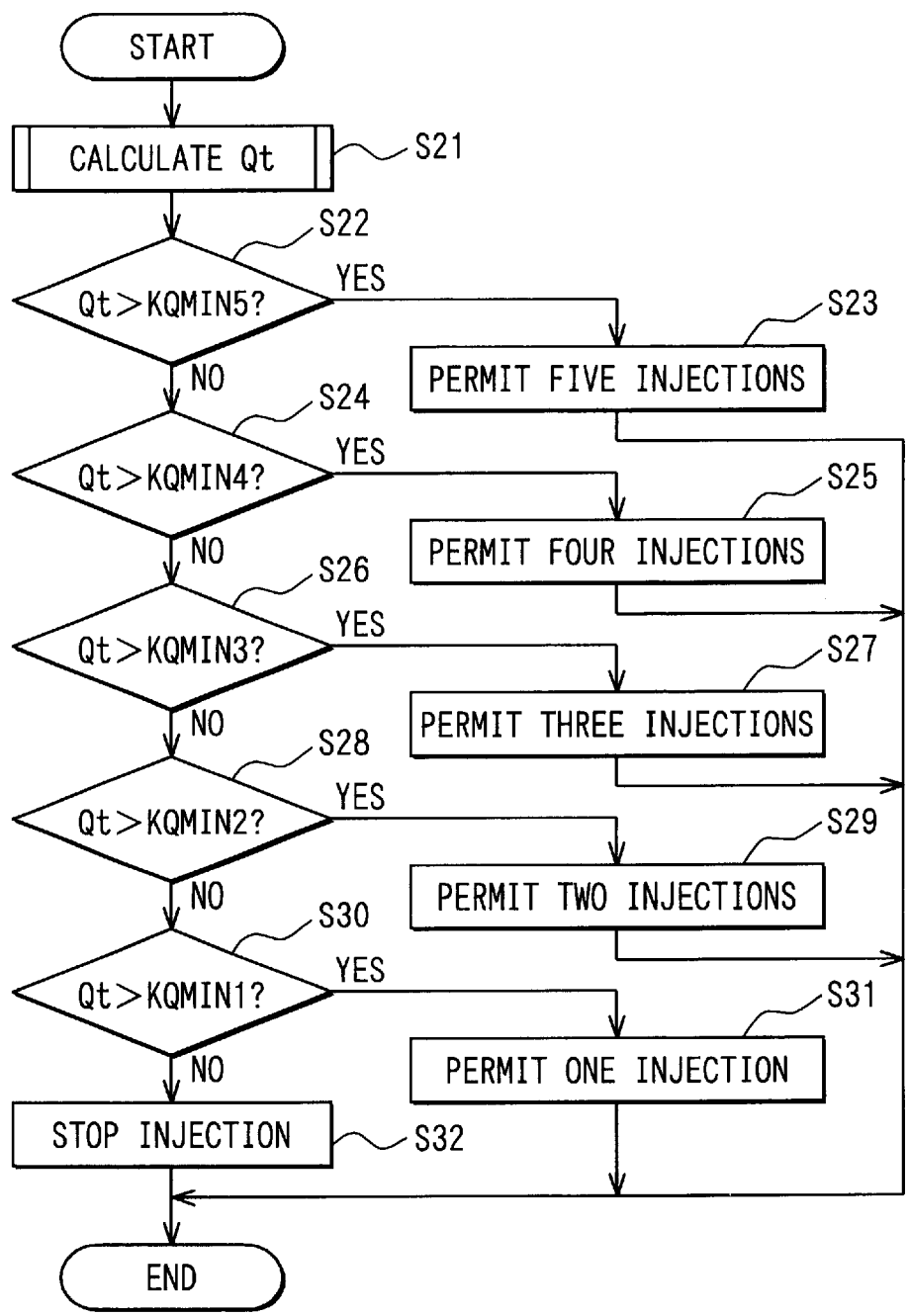
FIG. 5 is a flowchart showing a method for controlling a multi-injection frequency according to a second embodiment of the present invention.

When a routine shown in FIG. 5 is started after the FCCB correction or the ISC correction, the total injection quantity command value Qt is calculated like the first embodiment in Step S21. Then, it is determined whether the total injection quantity Qt is greater than an N times (five times, in the embodiment) injection permission determination value KQMIN5 or not in Step S22. If the result of the determination is "YES", N times (five times, in the embodiment) injections are permitted in Step S23. Then, the processing leaves the routine shown in FIG. 5.

If the result of the determination in Step S22 is "NO", the injection quantity command value Q1 is cleared (Q1=0) in Step S24. Meanwhile, it is determined whether the total injection quantity Qt is greater than an N minus one times (four times, in the embodiment) injection permission determination value KQMIN4 or not in Step S24. If the result of the determination is "YES", the N minus one times (four times, in the embodiment) injections are permitted in Step S25. After that, the processing leaves the routine shown in FIG. 5.

If the result of the determination in Step S24 is "NO", the injection quantity command value Q2 is cleared (Q2=0) in Step S26. Meanwhile, it is determined whether the total injection quantity Qt is greater than an N minus two times (three times, in the embodiment) injection permission determination value KQMIN3 or not in Step S26. If the result of the determination is "YES", the N minus two times (three times, in the embodiment) injections are permitted in Step S27. After that, the processing leaves the routine shown in FIG. 5.

If the result of the determination in Step S26 is "NO", the injection quantity command value Q3 is cleared (Q3=0) in Step S28. Meanwhile, it is determined whether the total injection quantity command value Qt is greater than an N minus three times (twice, in the embodiment) injection permission determination value KQMIN2 or not in Step S28. If the result of the determination is "YES", the N minus three times (twice, in the embodiment) injections are permitted in Step S29. Then the processing leaves the routine shown in FIG. 5.

If the result of the determination in Step S28 is "NO", the injection quantity command value Q4 is cleared (Q4=0) in Step S30. Meanwhile, it is determined whether the total injection quantity command value Qt is greater than an N minus four time(s) (once, in the embodiment) injection permission determination injection quantity KQMIN1 or not in Step S30. If the result of the determination is "YES", the N minus four time(s) (once, in the embodiment) injection is permitted in Step S31. Then the processing leaves the routine shown in FIG. 5.

If the result of the determination in Step S30 is "NO", the injection quantity command value Q5 for the fifth injection, the main injection in the multi-injection, is cleared (Q5=0), and thus, the entire injections are stopped. In this case, the injector 3 is determined to be out of order. Therefore, an anomaly-warning lamp (indicator lamp) is lit in order to urge a repair or replacement of the injector 3 in Step S32. Then, the processing leaves the routine shown in FIG. 5.

Figure 6:
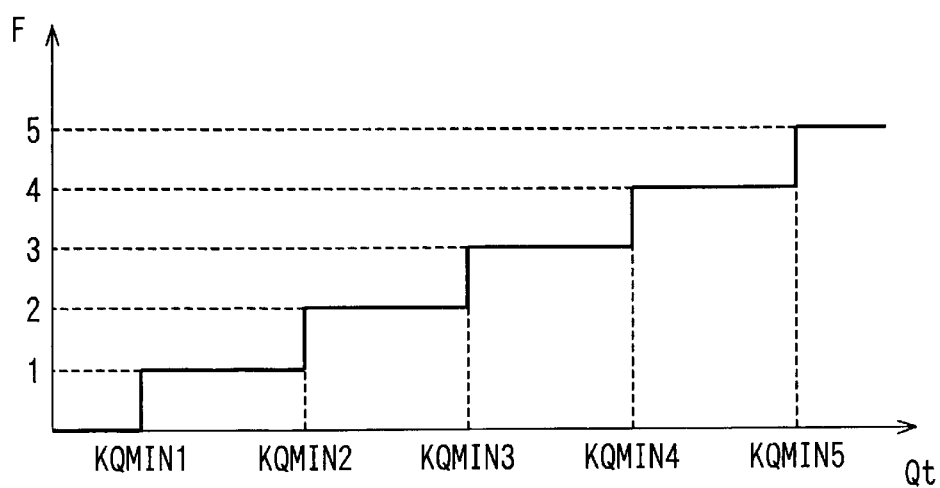
FIG. 6 is a graph showing a relation between a total injection quantity and the multi-injection frequency according to the second embodiment.

With the above calculation processing or control processing, the multi-injection frequency F is controlled in accordance with the total injection quantity Qt as shown in FIG. 6. Thus, the multi-injection frequency is controlled from five times to four times, to three times, to twice, and finally, to once. Therefore, an effect similar to the first embodiment is attained.

(Modifications)

In the embodiments, the present invention is applied to the injection frequency controlling method for the accumulation type fuel injection system. Alternatively, the present invention may be applied to an injection frequency controlling method for an internal combustion engine that has an electronically-controlled distribution type fuel injection pump or an electronically-controlled in-line type fuel injection pump instead of a common rail.

In the embodiments, the injector 3 having the electromagnetic fuel injection valve is employed as the fuel injection valve. Alternatively, an injector having a piezo-electric fuel injection valve may be employed as the fuel injection valve.

In the embodiments, the injection quantity command values Q1, Q2, Q3 and Q4 for the first injection, the second injection, the third injection and the fourth injection (the pilot injections) and the injection quantity command value Q5 for the fifth injection (the main injection) are set at the same value. Alternatively, the injection quantity command value Q1, Q2, Q3 or Q4 may be different from the injection quantity command value Q5. For, instance, the injection quantity command value Q5 may be greater than the injection quantity command value Q1, Q2, Q3 or Q4.

In the embodiments, the pilot injection command pulse period TQPILOT is used as the injection quantity command value for the pilot injection, and the main injection command pulse period TQMAIN is used as the injection quantity command value for the main injection. Alternatively, the pilot injection quantity QPILOT, which is calculated in accordance with the command injection quantity QFIN and the engine rotation speed NE, may be used as the injection quantity command value for the pilot injection. The main injection quantity QMAIN, which is calculated by subtracting the pilot injection quantity QPILOT from the total injection quantity command value Qt, may be used as the injection quantity command value for the main injection.

In the embodiments, the accumulation type fuel injection system capable of performing the multi-injection for injecting the fuel into a specific cylinder of the engine 1 in multiple times during the compression stroke or the expansion stroke of the engine 1 is explained. The multi-injection is performed by driving the electromagnetic valve of the injector 3 of the specific cylinder of the engine 1. The multi-injection includes one or more pilot injections and one main injection, for instance. Alternatively, the present invention may be applied to an accumulation type fuel injection system capable of performing a main injection and one or more after injections during the compression stroke or the expansion stroke of the engine 1. Alternatively, the present invention may be applied to an accumulation type fuel injection system capable of performing one or more pilot injections, one main injection, and one or more after injections.

In the embodiments, after the FCCB correction or the ISC correction, the routine shown in FIGS. 2 and 3 or the routine shown in FIG. 5 is performed. Alternatively, the routine shown in FIGS. 2 and 3 or the routine shown in FIG. 5 may be started when the engine 1 is in a state or conditions of a normal idling operation or a steady operation.

The present invention should not be limited to the disclosed embodiments, but may be implemented in many other ways without departing from the spirit of the invention.

What is claimed is:

1. An injection ratio control system for an internal combustion engine that drives fuel injection valves based on an injection quantity command value set in accordance with an operating state or operating conditions of the engine and performs a multi-injection for injecting fuel into cylinders of the engine in multiple times by driving the fuel injection valves multiple times during a compression stroke or an expansion stroke of the engine, the system comprising:

injection quantity command value determining means for calculating a main injection quantity command value for a main injection in the multi-injection in accordance with the operating state or the operating conditions of the engine; and injection frequency regulating means for regulating an injection frequency per combustion in the multi-injection so that the main injection quantity command value becomes equal to or greater than an N time(s) minimum guarantee determination value.

2. The injection ratio control system as in claim 1, wherein;

the system regulates the injection frequency per combustion in the multi-injection to N time(s) when the main injection quantity command value is equal to or greater than the N time(s) minimum guarantee determination value, and the system regulates the injection frequency per combustion in the multi-injection to N minus one time(s) when the main injection quantity command value is less than the N time(s) minimum guarantee determination value.

3. An injection ratio control system for an internal combustion engine that drives fuel injection valves based on an injection quantity command value set in accordance with an operating state or operating conditions of the engine and performs a multi-injection for injecting fuel into cylinders of the engine in multiple times by driving the fuel injection valves multiple times during a compression stroke or an expansion stroke of the engine, the system comprising:

injection quantity determining means for calculating a total injection quantity in- accordance with the operating state or the operating conditions of the engine; and injection frequency regulating means for regulating an injection frequency per combustion in the multi-injection so that the total injection quantity exceeds an N time(s) injection permission determination value.

4. The injection ratio control system as in claim 3, wherein;

the system permits the injection frequency per combustion in the multi-injection to be set up to N time(s) when the total injection quantity is greater than the N time(s) injection permission determination value, and the system permits the injection frequency per combustion in the multi-injection to be set up to N minus one time(s) when the total injection quantity is equal to or less than the N time(s) injection permission determination value.

5. The injection ratio control system as in claim 2, wherein the system maintains the main injection and prohibits the first or the last injection except the main injection when the system regulates the injection frequency per combustion in the multi-injection to N minus one time(s).

* * * * *